(12) United States Patent
Yamasaki et al.

(10) Patent No.: US 8,332,093 B2
(45) Date of Patent: Dec. 11, 2012

(54) VIRTUAL VEHICLE INTERFACE

(75) Inventors: Bryan Else Yamasaki, Ann Arbor, MI (US); Jeffrey Edward Pierfelice, Canton, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 303 days.

(21) Appl. No.: 12/778,564

(22) Filed: May 12, 2010

(65) Prior Publication Data

US 2011/0282537 A1 Nov. 17, 2011

(51) Int. Cl.
*G01M 17/00* (2006.01)
(52) U.S. Cl. ........................ 701/29.1; 701/36; 340/425.5
(58) Field of Classification Search ................ 701/29.1, 701/36; 340/425.5, 438, 459
See application file for complete search history.

(56) References Cited

U.S. PATENT DOCUMENTS

| 6,131,060 | A | 10/2000 | Obradovich et al. | |
|---|---|---|---|---|
| 6,275,231 | B1 * | 8/2001 | Obradovich | 345/156 |
| 6,493,615 | B1 * | 12/2002 | Johnston | 701/29.1 |
| 7,225,413 | B1 | 5/2007 | Kuenzner et al. | |
| 7,292,918 | B2 * | 11/2007 | Silvester | 701/33.4 |
| 7,330,198 | B2 * | 2/2008 | Yamaguchi et al. | 345/653 |
| 8,239,087 | B2 * | 8/2012 | Dybalski et al. | 701/29.1 |
| 2008/0249682 | A1 | 10/2008 | Wisniewski et al. | |

FOREIGN PATENT DOCUMENTS

| JP | 05-112161 | 5/1993 |
|---|---|---|
| JP | 2005-119465 | 5/2005 |
| JP | 2009023471 | 2/2009 |

* cited by examiner

*Primary Examiner* — Michael McCullough
(74) *Attorney, Agent, or Firm* — Gifford, Krass, Sprinkle, Anderson & Citkowski, P.C.

(57) ABSTRACT

A virtual vehicle interface system for use in a motor vehicle. The system can include a screen having a screen region and an image module that is operable to display an image of a portion of the motor vehicle on the screen region. The image can display a feature of the motor vehicle and an information tag can also be displayed and be proximate to the feature. The screen and the image module are operable to rotate the image of the motor vehicle and display different views of the motor vehicle using a remote control device or by pressing an object such as an individual's finger onto and moving it across the screen. In addition, a change of a setting and/or state of the motor vehicle can be altered by activating the information tag.

16 Claims, 6 Drawing Sheets

VIRTUAL VEHICLE INTERFACE

FIELD OF THE INVENTION

The present invention relates to a virtual vehicle interface for a motor vehicle, and in particular, a virtual vehicle interface system having a screen, an image module, and an information module.

BACKGROUND OF THE INVENTION

Motor vehicles have various components that must be maintained, and as such, should be periodically inspected. For example, proper tire air pressure, liquid and/or coolant levels, headlight, taillight and brake light status, are all aspects of a vehicle that can be regularly inspected and maintained. In addition, some components can have more than one position or setting during operation of the vehicle with knowledge of the present position and the ability to change the position being desirable. For example, a sun roof for the vehicle can have a closed position and one or more open positions, and a convertible top can have an extended position and a retracted position. Components such as door locks, power windows, and the like can have settings that prevent a child riding in the vehicle from unlocking a door, lowering a window, etc.

Most motor vehicles provide some type of component information such as a warning light by using various locations on an instrument panel. However, heretofore displays of component information have required a driver of the motor vehicle to view various locations of the instrument panel and/or manipulate one or more control knobs. As such, an improved display of warning information, component information, etc., within a motor vehicle would be desirable.

SUMMARY OF THE INVENTION

The present invention discloses a virtual vehicle interface system for use in a motor vehicle. The system can include a screen having a screen region and an image module that is operable to display an image of a portion of the motor vehicle on the screen region. In some instances, the screen can be a touch screen, or in the alternative, a "touchless" screen such as included with the "Remote Touch" haptic interface provided by Toyota Motor Corporation. The image can display a feature of the motor vehicle and an information tag can also be displayed and be proximate to the feature. The screen and the image module are operable to rotate the image of the motor vehicle and display different views thereof when an object such as an individual's finger is pressed onto and moved across the touch screen or an operating knob/remote control device for a touchless screen.

An information module can also be included and have information associated with the information tag that is displayed on the screen region and the image module can display the information associated with the information tag when the tag is activated. In some instances, the information tag can be activated by applying pressure on the touch screen at a location corresponding to the display of the information tag.

The image of the portion of the motor vehicle can also have a plurality of features displayed on the screen region, the plurality of features each optionally having an information tag associated therewith. In addition, the information module can have information for each of the plurality of information tags. It is appreciated that the image module can display information for a particular information tag when that particular tag is activated.

The image module can display a plurality of different views of the motor vehicle. For example and for illustrative purposes only, the image module can display a front view, a front-left side view, a rear-left side view, a rear view, a rear-right side view, a right side view, a front-right side view and the like. In the alternative, the image module can provide a rotational view of the vehicle with a fluid change of what is available for viewing on the screen and not a jump from one image to another image. In this manner, a user can use the touch screen to obtain a 360 degree view of the motor vehicle. In addition, when a particular view of the motor vehicle is displayed on the touch screen, information tags associated with features that are observable from that view can also be displayed and optionally activated. In some instances, activation of an information tag can result in a different image of the motor vehicle being displayed on the screen region.

For example and for illustrative purposes only, the different image can be an image of the feature in an open position such as an open position of a hood, a trunk lid, a gas door, a sliding door, a convertible top, a sun roof, etc. In addition, the different image can have an additional one or more information tags proximate to an additional feature that is displayed. Activation of such an additional information tag can result in the image module and/or the information module providing information on the additional feature and/or the display of at least one action item that can be executed by the motor vehicle.

The at least one action item can include moving a gas door, a sliding door, a convertible top, a sun roof, a door lock, etc., from a first position to a second position. The at least one action item can also include setting a rear door child lock into a locked position or an unlocked position, setting a rear window lock into a locked position or an unlocked position, activating a parking assist function, viewing maintenance information, and the like. In some instances, activation of the additional information tag can result in a drop-down list of action items being displayed on the screen region with at least one of the action items activatable by pressing on the touch screen at a location where the action item is displayed.

DETAILED DESCRIPTION OF THE PRESENT INVENTION

The present invention provides a virtual vehicle interface system for use in a motor vehicle. As such, the present invention has utility as a component for a motor vehicle.

The virtual vehicle interface system provides a screen and an image of the motor vehicle that can be rotated on the screen such that a desired view of the vehicle can be observed by a driver, a passenger, and the like. One or more views of the vehicle on the screen can have an information tag that can be activated and result in information being provided to a user. In some instances, the screen can be a touch screen and/or the information tag can be associated with and/or located proximate to a feature of the motor vehicle. In the alternative, the screen can be a "touchless" screen such as included with the "Remote Touch" haptic interface provided by Toyota Motor Corporation.

Activation of the information tag can be afforded by selecting the information tag using a remote control device and/or applying pressure to the touch screen, assuming naturally that the screen is a touch screen, at a location where the information tag is displayed. Once the information tag has been activated, a different view of the motor vehicle can be displayed on the screen and/or information on the feature that the tag is associated with can be displayed.

If a particular feature of the motor vehicle is not shown on the screen, the user use the remote control device to rotate the image of the vehicle until a desired view with a desired feature is provided. In the alternative, if the screen is a touch screen, the user can swipe the screen, i.e. use an object such as a finger to press and move along the screen, and rotate the image of the vehicle until a desired view with a desired feature is provided. In this manner, a 360 degree view of the vehicle can be provided with features associated therewith displayed on the screen. Likewise, information tags associated with the various features can also be displayed on the screen.

Figure 1:
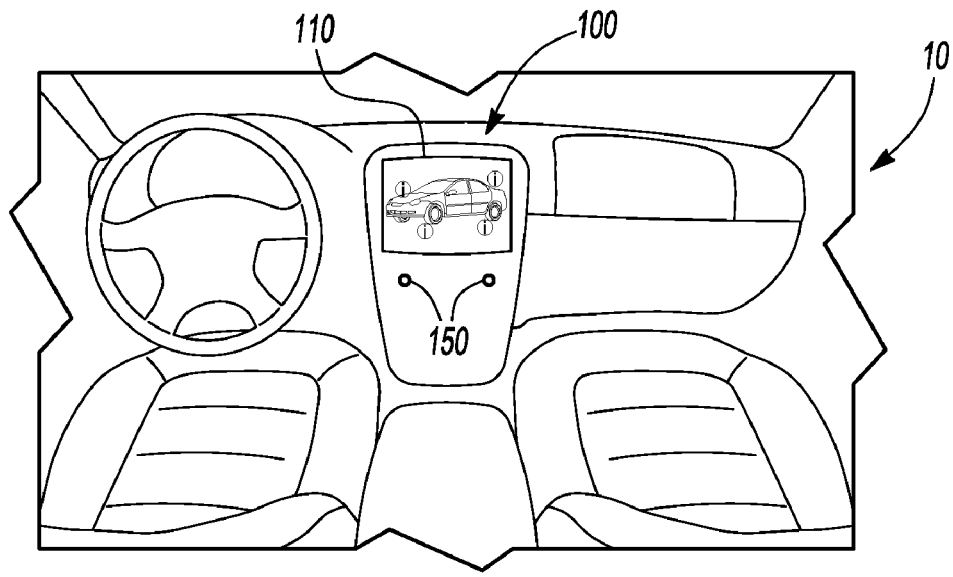
FIG. 1 is a schematic illustration of an interior of a motor vehicle with a virtual vehicle interface according to an embodiment of the present invention.

Turning now to the figures, FIG. 1 illustrates a portion of an interior 10 of a motor vehicle having a virtual vehicle interface system 100. The interface system 100 can have a screen 110 and one or more control knobs 150. The one or more control knobs 150 may or may not be used to provide an image of the motor vehicle on the screen 110 as shown in FIG. 1.

Figure 2:
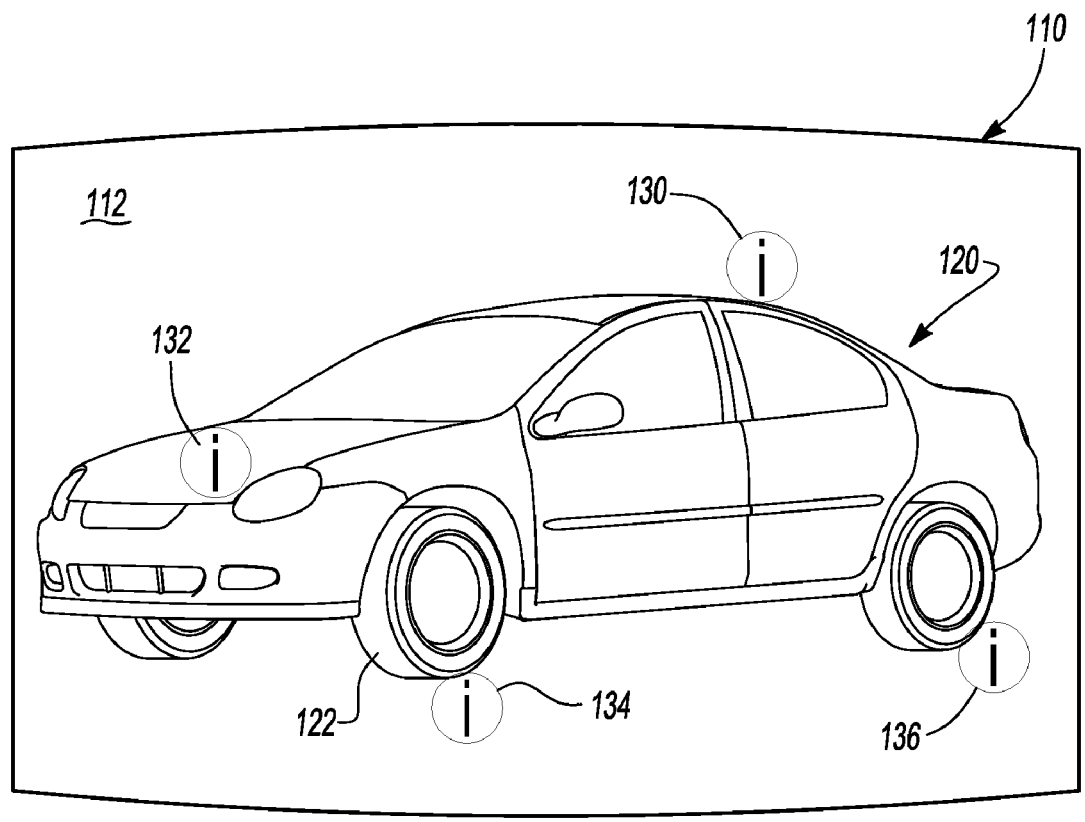
FIG. 2 is a schematic illustration of an image of a motor vehicle on a screen and information tags associated with features of the motor vehicle according to an embodiment of the present invention.
Figure 3:
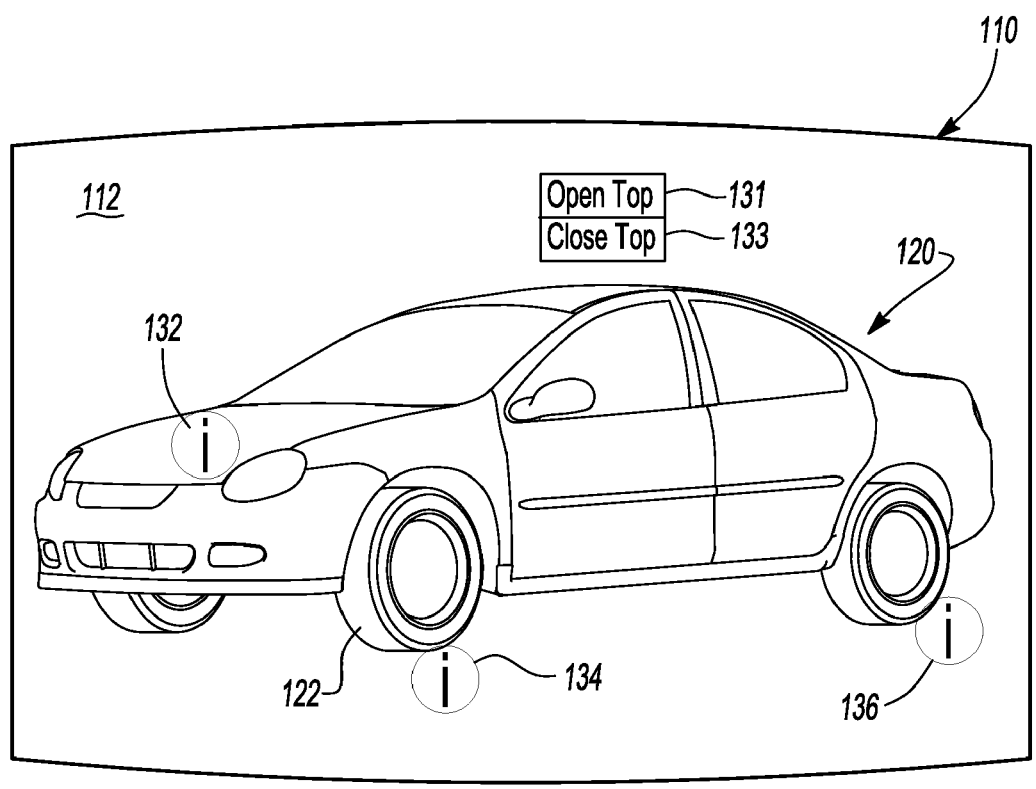
FIG. 3 is a schematic illustration of the screen shown in FIG. 2 illustrating an action item being displayed after an information tag has been activated.

Referring now to FIG. 2, an enlarged view of the screen 110 shown in FIG. 1 is provided. The screen 110 can have a screen region 112 that can display an image 120 of a motor vehicle. For example and for illustrative purposes only, FIG. 2 shows a front-left side view of the motor vehicle. For the purposes of the present invention, the term left side and right side correspond to the left and right of a driver seated in the motor vehicle.

As shown in FIG. 2, features such as tires, doors, a hood, a headlight, minors, and the like are viewable on the screen 110. In addition, information tags illustratively shown as a circle with an 'i' therein are shown generally at reference numerals 130, 132, 134 and 136. The information tags can be associated with and/or proximate to a feature of the motor vehicle.

For example, the information tag 130 can be associated with a convertible top (not shown) of the motor vehicle, with activation of the tag 130 providing action items 131 and 133 which can be executed by pressing on the screen 110 at the desired location associated with the Open Top 131 action item or Close Top 133 action item if the screen is a touch screen. In the alternative, the Open Top 131 or Close Top 133 action item can be executed with a remote control device. It is appreciated that one of the action items may not be displayed depending on the current status of a motor vehicle feature. Stated differently, if the convertible top is in a closed position, activation of the information tag 130 could afford for only the action item 131 being displayed on the screen region 112 of the screen 110.

Figure 4:
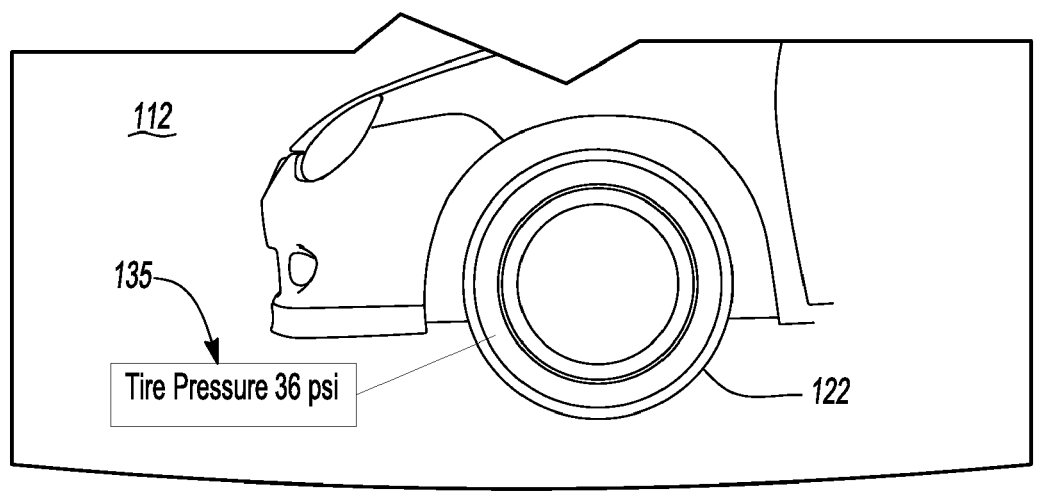
FIG. 4 is a schematic illustration of the screen shown in FIG. 2 illustrating a different displayed image after an information tag has been activated.

Another example of an information tag activation is shown in FIG. 4. The information tag 134 can be associated with a vehicle tire 124 with activation of the tag 134 affording an enlarged view of the vehicle tire 122. In addition, information 135 regarding the tire 122 can be displayed. In some instances, the information 135 can include a current tire air pressure for the tire 122. In this manner, a user can check information on a feature of the motor vehicle.

Figure 5:
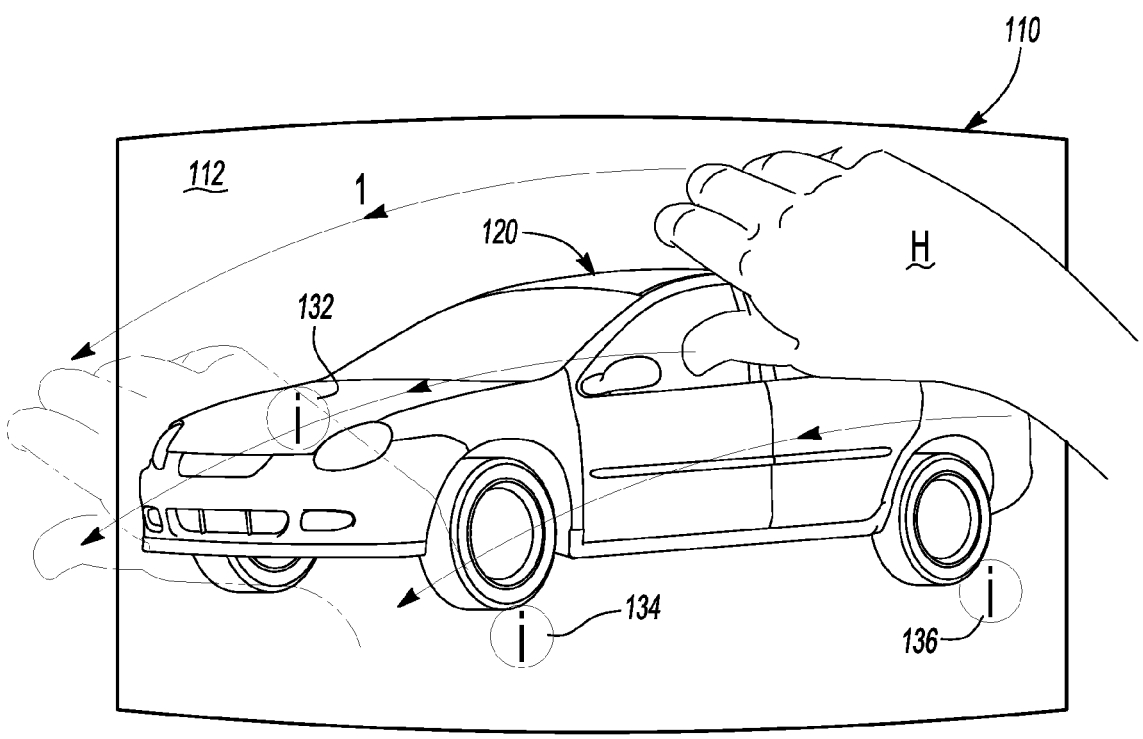
FIG. 5 is a schematic illustration of a user rotating an image of a motor vehicle on a touch screen according to an embodiment of the present invention.
Figure 6:
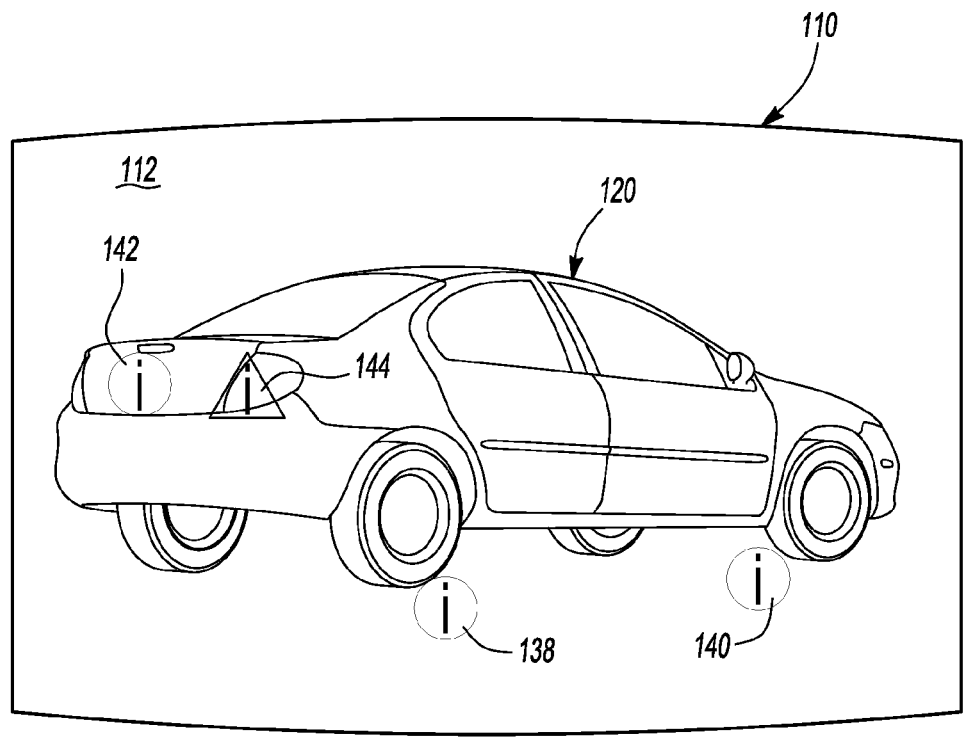
FIG. 6 is a different view of an image of the motor vehicle shown in FIG. 2.

It is appreciated from FIG. 2 that information tags 134 and 136 are available for activation; however, information tags for vehicle tires on an opposite side of the vehicle are not accessible. However, information on features located on the opposite side of the vehicle can be obtained by rotating the image 120 on the screen region 112, for example by swiping a finger or hand H in a first direction 1 on a touch screen, thereby rotating the image 120 as illustrated in FIGS. 5 and 6. As shown in FIG. 6, a rear-right side view of the vehicle 120 is shown along with information tags 138, 140 and 142. It is appreciated from FIG. 6 that information tag 138 can be associated with and is located proximate to the right rear tire of the vehicle. In addition, the information tag 140 is associated with the front right tire of the vehicle and information tag 142 is associated with the trunk lid.

In some instances, an information tag itself can provide information on a feature of the motor vehicle. For example and for illustrative purposes only, information tag 144 can be displayed only in the event that a light emitting device at this particular location, i.e. a rear tail light, rear brake light, etc., has stopped operating properly. In this manner, the display of an information tag such as tag 144 can alert a user that the light emitting device should be replaced. In the alternative, the information tag 144 can operate in a similar fashion as tags 138 in that the tag 144 must be activated by a user before information of the light emitting device is displayed.

Figure 7:
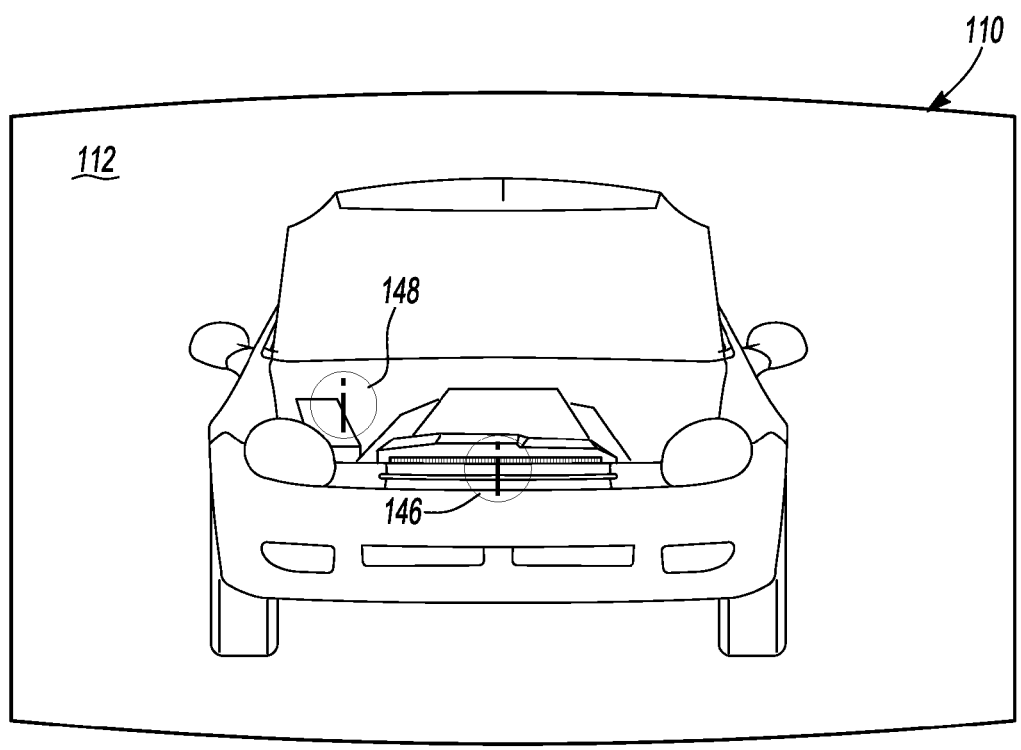
FIG. 7 is a schematic illustration of a front view for the motor vehicle shown in FIG. 2 with a hood in an open position.

Turning now to FIG. 7, a schematic illustration for the screen 110 after the information tag 132 shown in FIG. 2 has been activated is provided. In particular, a hood of the motor vehicle image 120 is shown in an open position with an image of an engine area under the hood also provided. In addition, additional information tags are shown under the hood, illustratively including information tags 146 and 148. For example and for illustrative purposes only, the information tag 146 can be associated with a radiator for the motor vehicle, whereas the information tag 148 can be associated with a battery for the motor vehicle.

Figure 8:
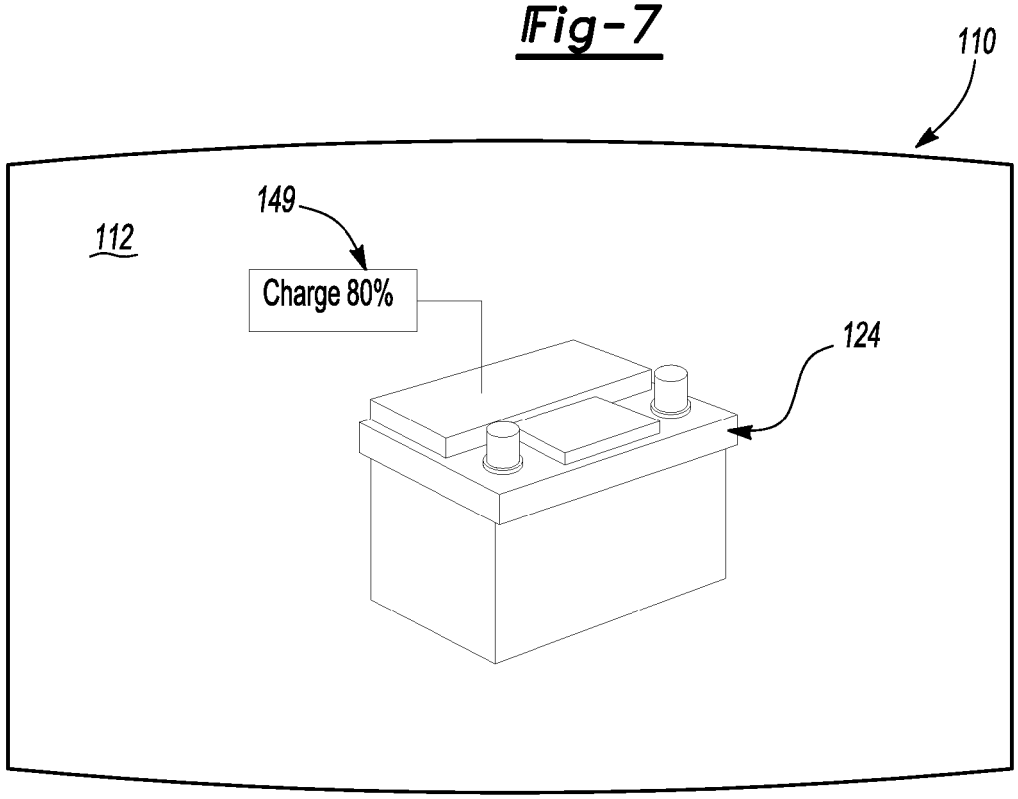
FIG. 8 is a schematic illustration of an image on the screen after an information tag associated with a battery has been activated.

In some instances, activation of the information tag 148 can afford for an image of a battery for the motor vehicle being displayed on the screen 110 as shown in FIG. 8 with optional information 149 also provided. The information 149 can include a current charge status for the battery 124, and though not shown, activation of information tag 146 can provide information such as a temperature for cooling liquid in the radiator, a cooling liquid level, whether or not cooling liquid within the radiator should be changed, and the like.

Figure 9:
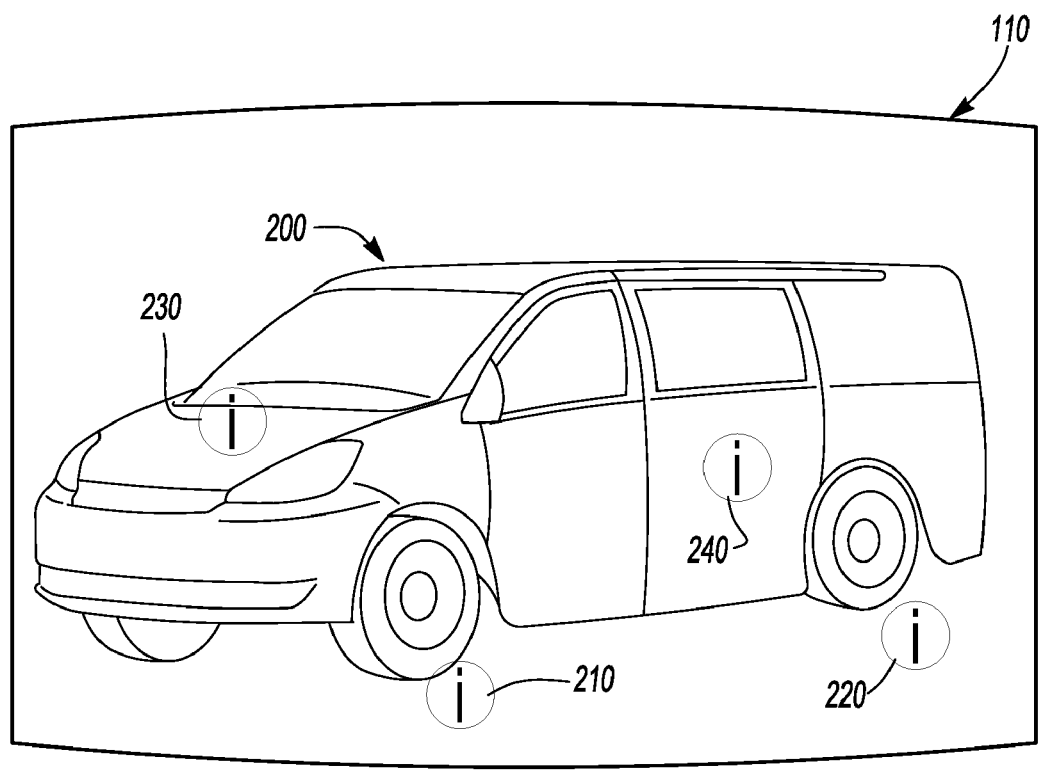
FIG. 9 is a front-left side view of a motor vehicle on a screen according to another embodiment of the present invention.
Figure 10:
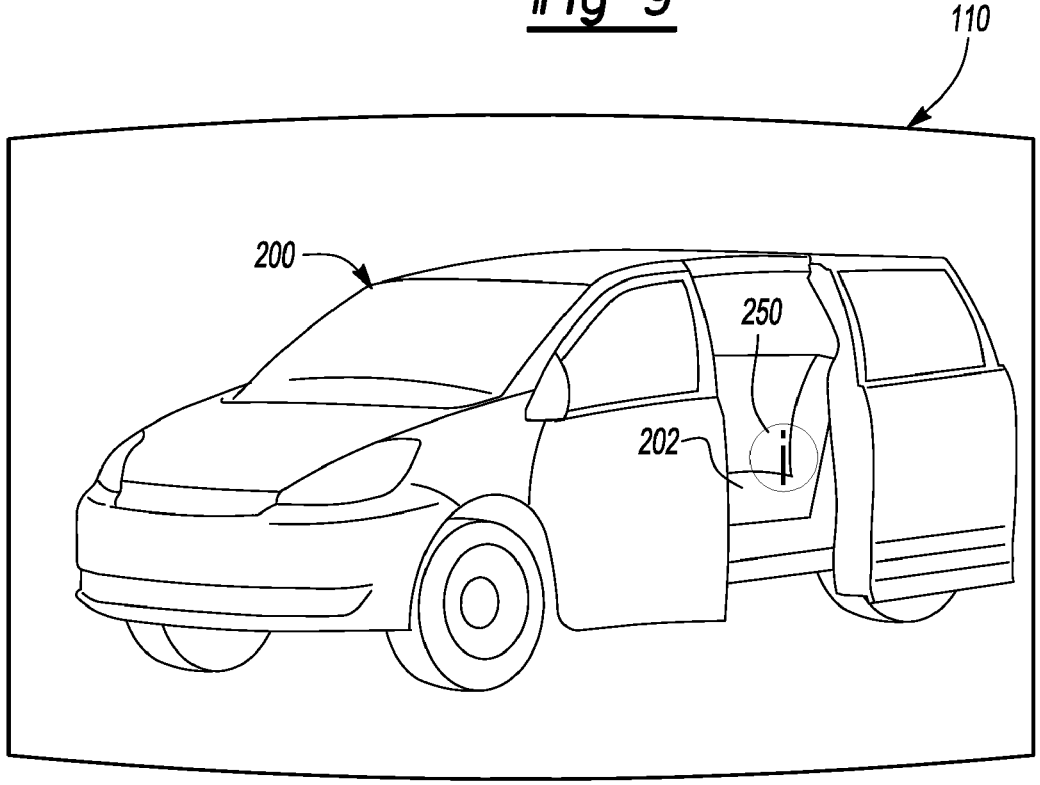
FIG. 10 is a schematic illustration of a sliding door in an open position after an information tag has been activated.

Turning now to FIGS. 9 and 10, another example of an image of a motor vehicle 200 is shown on the screen 110. It is appreciated that the image of the vehicle shown on the screen 110 can correspond to the actual vehicle in which the virtual vehicle interface system is installed. As such, it is appreciated that the image 200 corresponds to a van or minivan that contains a virtual vehicle interface system according to an embodiment of the present invention. The image 200 can include a plurality of features such as tires, sliding doors, a hood, headlights, and the like. In addition, a plurality of information tags illustratively shown as 210, 220, 230 and 240 can be displayed on the screen 110.

Similar to the information tags discussed above, activation of a tag such as tag 240 can afford for a different image to be provided on the screen 110 such as a sliding door being shown in an open position along with a view of at least a portion of an interior for the vehicle. In addition, once the sliding door is opened, an additional information tag 250 can be shown and be associated with a seat 202. Activation of the information tag 250 can provide information associated with the seat 202, illustratively including whether or not a seatbelt associated with the seat has been fastened, an action item that affords for the seat to be moved from a first position to a second position and the like. In this manner, a user can use the screen 110 of the virtual vehicle interface system 100 to perform operations such as opening a sliding door, closing a sliding door, moving a seat from a first position to a second position, checking an operation status of a light emitting device, checking the air pressure of one or more tires, checking liquid levels, opening a sun roof, opening a convertible top, closing the same, and the like.

Figure 11:
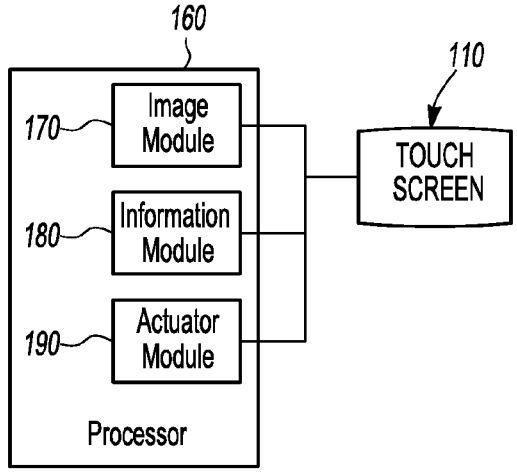
FIG. 11 is a schematic diagram illustrating a processor and modules in communication with the screen according to an embodiment of the present invention.
Figure 12:
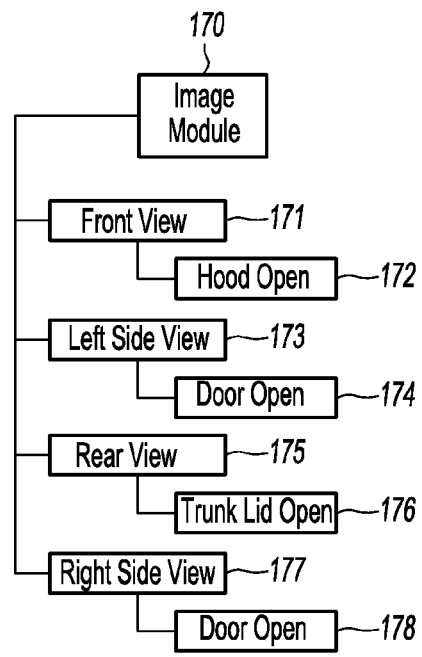
FIG. 12 is a schematic diagram illustrating a list of possible images that can be provided by an image module according to an embodiment of the present invention.

In some instances, a processor, an image module, an information module, an actuator module and the like can be in communication with the screen 110. For example and for illustrative purposes only, FIG. 11 is a schematic diagram of a processor 160 having an image module 170, an information module 180 and an actuator module 190 in communication with the screen 110. As shown in FIG. 12, the image module 170 can have a plurality of images that can be displayed on the screen 110, illustratively including a front view 171, with an optional hood open 172, a left side view 173, with an optional door open 174, and the like.

Figure 13:
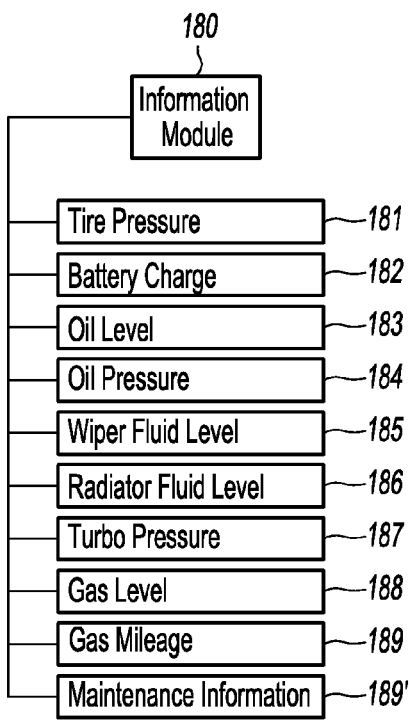
FIG. 13 is a schematic diagram illustrating a list of possible information that can be provided by an information image module according to an embodiment of the present invention.

The information module 180 can have information on a plurality of motor vehicle features. For example and for illustrative purposes only, FIG. 13 illustrates the information module 180 operable to provide information on tire pressure 181, battery charge 182, oil level, 183, oil pressure 184, windshield wiper fluid level 185, radiator fluid level 186, turbo pressure 187 assuming the motor vehicle is turbocharged, fuel or gas level 188, current and/or average gas mileage 189, maintenance information 189☐, etc.

Figure 14:
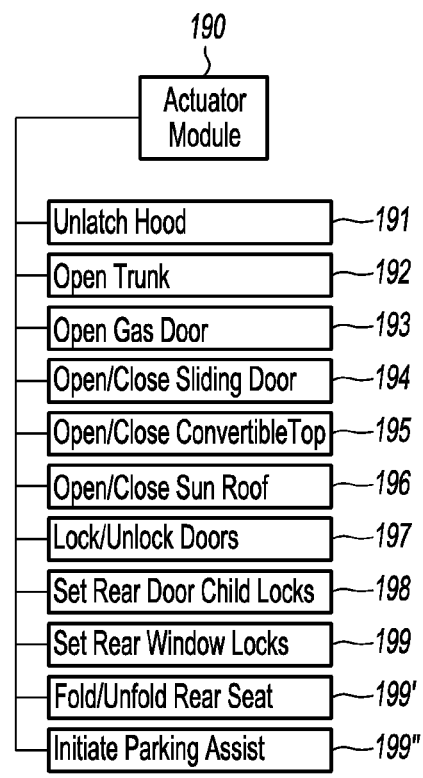
FIG. 14 is a schematic diagram illustrating a list of action items that can be executed by an actuator module according to an embodiment of the present invention.

The actuator module 190 can provide actuation or execution of one or more action items for the motor vehicle. For example and for illustrative purposes only, FIG. 14 illustrates the actuator module 190 operable to actuation or execution action items such as unlatch the hood 191, open the trunk 192, open the gas or fuel door 193, open or close a sliding door 194, open or close a convertible top 195, open or close a sun roof 196, lock or unlock one or more doors 197, set rear door child locks 198, set rear window locks 199, fold or unfold one a rear seat 199 ☐, initiate a parking assist function 199☐☐, etc.

It is appreciated that the image module 170 can display aspects of the information module 180 and/or actuator module 190 on the screen region 112 of the screen 110. For example, information provided by the information module 180 on one or more features of the motor vehicle can be displayed on the screen region 112 via the image module 170. In addition, information as to the current status and/or completed execution of one or more action items can be displayed on the screen region 112 via the image module 170. In this manner, the processor 160, image module 170, information module 180 and/or actuator module 190 coordinate and/or operate with each other to provide desired images and/or information on the screen region 112 of the screen 110.

It is appreciated that any type of screen and/or touch screen known to those skilled in the art can be used with the virtual vehicle interface system of the present invention. In addition, images of the motor vehicle can be actual photographic images, illustrative line drawings, illustrative CAD drawings, and the like. As such, the invention is not restricted to the illustrative examples and embodiments described above. The examples and embodiments are not intended as limitations on the scope of the invention. Apparatus, systems, and the like described herein are exemplary and not intended as limitations on the scope of the invention. Changes therein and other uses will occur to those skilled in the art. Accordingly, the scope of the invention is defined by the scope of the claims.

We claim:

1. A virtual vehicle interface system for a motor vehicle comprising:
a screen having a screen region;
an image module operable to display an image of a portion of said motor vehicle on said screen region, said image displaying a first feature of said motor vehicle and a first information tag proximate to and associated with said first feature;
said screen and said image module operable to rotate said image of said motor vehicle and display different views of said motor vehicle, said screen and image module also operable to display an image of said first feature of said motor vehicle in an open position when said first information tag is activated and a second information tag proximate to and associated with a second feature that is visible only after said first feature is displayed in said open position;
an information module having information associated with said first and second information tags and said first and second features displayed on said screen region;
said image module also operable to display said information on said first and second features of said motor vehicle when said first and second information tags, respectively, are activated by at least one of a remote control device and applying pressure on said screen where said first and second information tags, respectively, are located.

2. The virtual vehicle interface system of claim 1, wherein said image of said portion of said motor vehicle displays a plurality of features of said motor vehicle.

3. The virtual vehicle interface system of claim 2, wherein said image module is operable to display a plurality of information tags on said screen region, each of said plurality of information tags associated with and located proximate to at least one of said plurality of features.

4. The virtual vehicle interface system of claim 3, wherein said information module has information for each of said plurality of information tags.

5. The virtual vehicle interface system of claim 4, wherein said image module is operable to display said information for a given information tag when said given information tag is activated.

6. The virtual vehicle interface system of claim 1, wherein a different view of said motor vehicle is selected from a group consisting of a front view, a front-left side view, a rear-left side view, a rear view, a rear-right side view, a right side view and a front-right side view.

7. The virtual vehicle interface system of claim 1, wherein said first feature is selected from a group consisting of a hood, a trunk lid, a gas door, a door, a convertible top and a sun roof.

8. The virtual vehicle interface system of claim 7, further comprising said image module operable to display at least one action item when said additional information tag is activated.

9. The virtual vehicle interface system of claim 8, wherein said at least one action item is selected from a group consisting of moving said gas door from a first position to a second position, moving a sliding door from a first position to a second position, moving said convertible top from a first position to a second position, moving said sun roof from a first position to a second position, moving a door lock from a first position to a second position, setting a rear door child lock, setting a rear window lock, activating a parking assist function and viewing maintenance information.

10. The virtual vehicle interface system of claim 7, further comprising said image module operable to display a drop-down list of action items when said information tag is activated.

11. The virtual vehicle interface system of claim 1, wherein said information is selected from a group consisting of air pressure in a tire, current charge of a battery, liquid level of a motor vehicle component and operation status of a light emitting device.

12. The virtual vehicle interface system of claim 1, wherein said image module displays only information tags for features displayed on said image.

13. The virtual vehicle interface system of claim 12, wherein said image module displays previously hidden information tags when said image of said motor vehicle is rotated.

14. A process for checking a current status of a feature of a motor vehicle comprising:
provinding a screen, the screen being at least one of a touch screen and a touchless screen;
providing an image module in communication with the screen and operable to display an image of a portion of the motor vehicle on the screen, the image having a first feature of the motor vehicle and a first information tag proximate to and associated with the first feature, the screen and image module also operable to display an image of the first feature in an open position when the first information tag is activated and a second information tag proximate to and associated with a second feature that is visible only after the first feature is displayed in the open position;
providing an information module having information associated with the first and second information tags displayed on the screen;
activating the first information tag by at least using a remote control device or pressing an object onto the touch screen at a location where the first information tag is located, the screen and image module displaying the first feature in the open position and the second feature with the second information tag proximate thereto; and
activating the second information tag and providing information on the second feature after the second information tag has been activated.

15. The process of claim 14, wherein the image of the portion of the motor vehicle displays a plurality of features of the motor vehicle.

16. The process of claim 15, wherein the image module displays a plurality of information tags on the touch screen with each of the plurality of information tags associated with and located proximate to at least one of the plurality of features.

\* \* \* \* \*

UNITED STATES PATENT AND TRADEMARK OFFICE
CERTIFICATE OF CORRECTION

PATENT NO.       : 8,332,093 B2  
APPLICATION NO.  : 12/778564  
DATED            : December 11, 2012  
INVENTOR(S)      : Bryan Else Yamasaki et al.

Page 1 of 1

It is certified that error appears in the above-identified patent and that said Letters Patent is hereby corrected as shown below:

In the Specification

At column 4, line number 6, please delete "minors" and insert --mirrors--;

At column 5, line 62, please delete "189□" and insert --189'--;

At column 6, line 5, please delete "199□" and insert --199'--;

At column 6, line 5, please delete "199□□" and insert --199"--.

Signed and Sealed this  
Eighteenth Day of November, 2014

Michelle K. Lee  
*Deputy Director of the United States Patent and Trademark Office*